Dec. 24, 1935.                J. B. MENTON                    2,025,065
                            ALL-METAL CAR BODY
                         Filed April 23, 1930              6 Sheets-Sheet 1
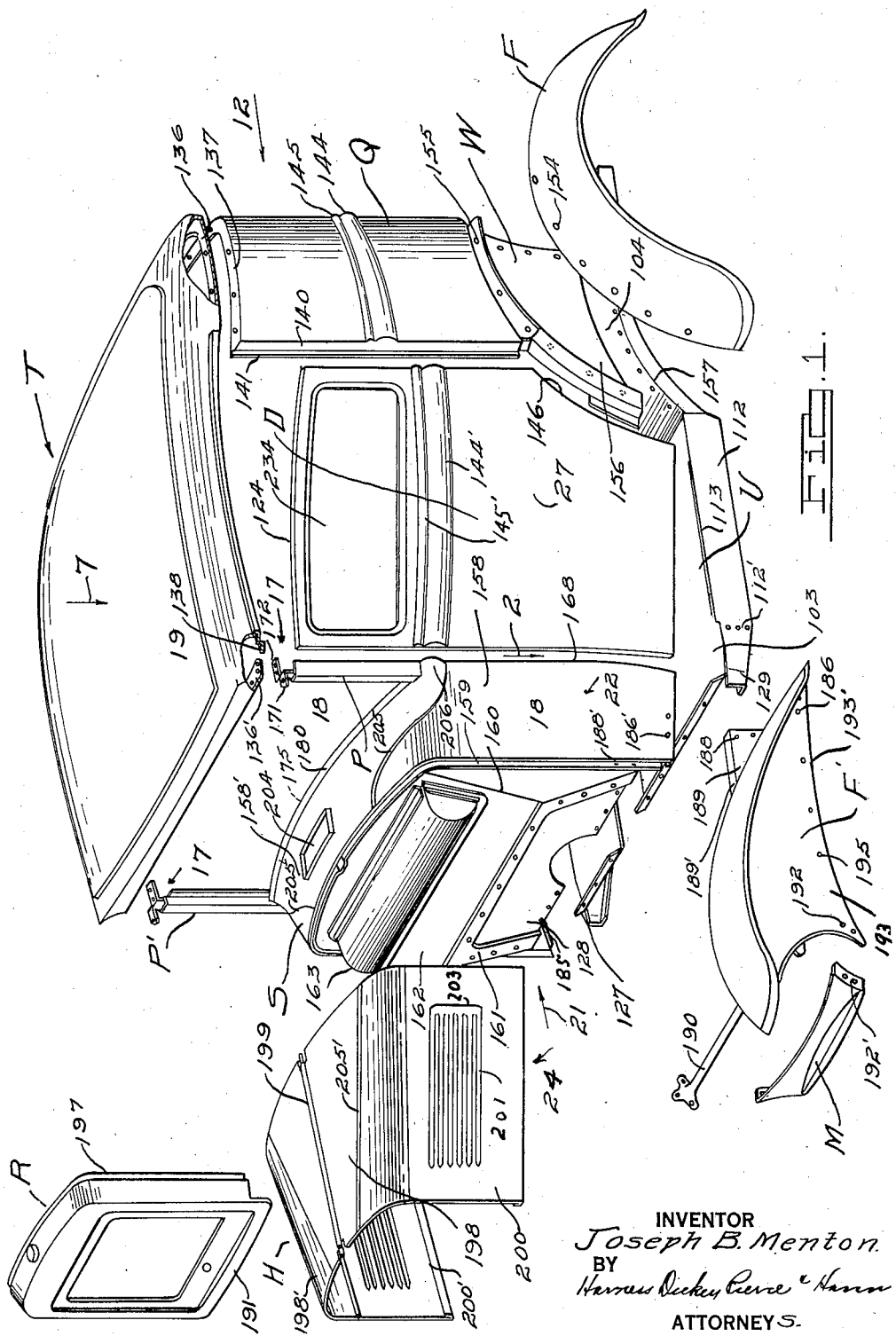
INVENTOR
Joseph B. Menton.
BY
Harness Dickey Pierce & Hann
ATTORNEYS.

Dec. 24, 1935.　　　J. B. MENTON　　　2,025,065
ALL-METAL CAR BODY
Filed April 23, 1930　　　6 Sheets-Sheet 2
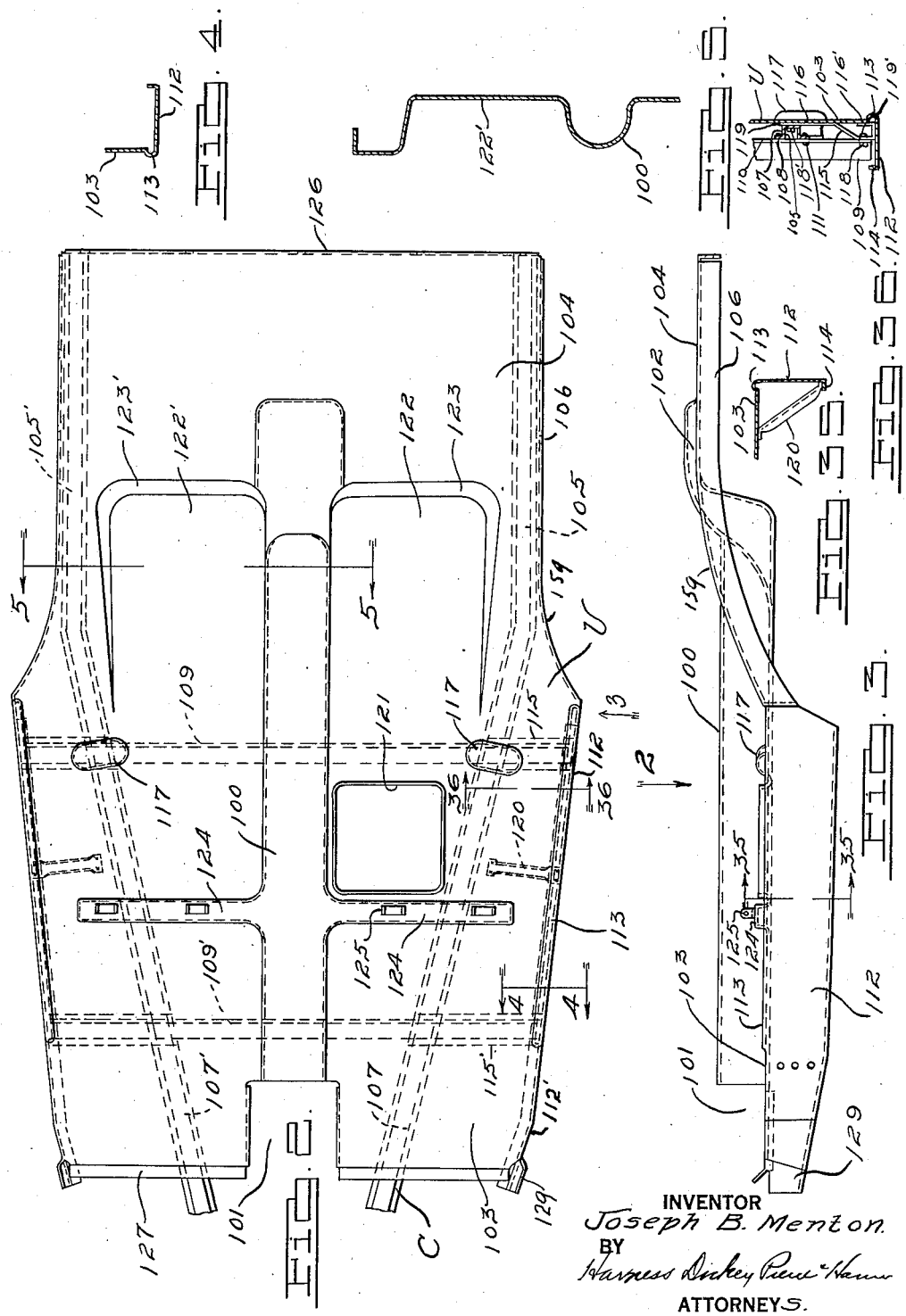
INVENTOR
Joseph B. Menton.
BY
ATTORNEYS.

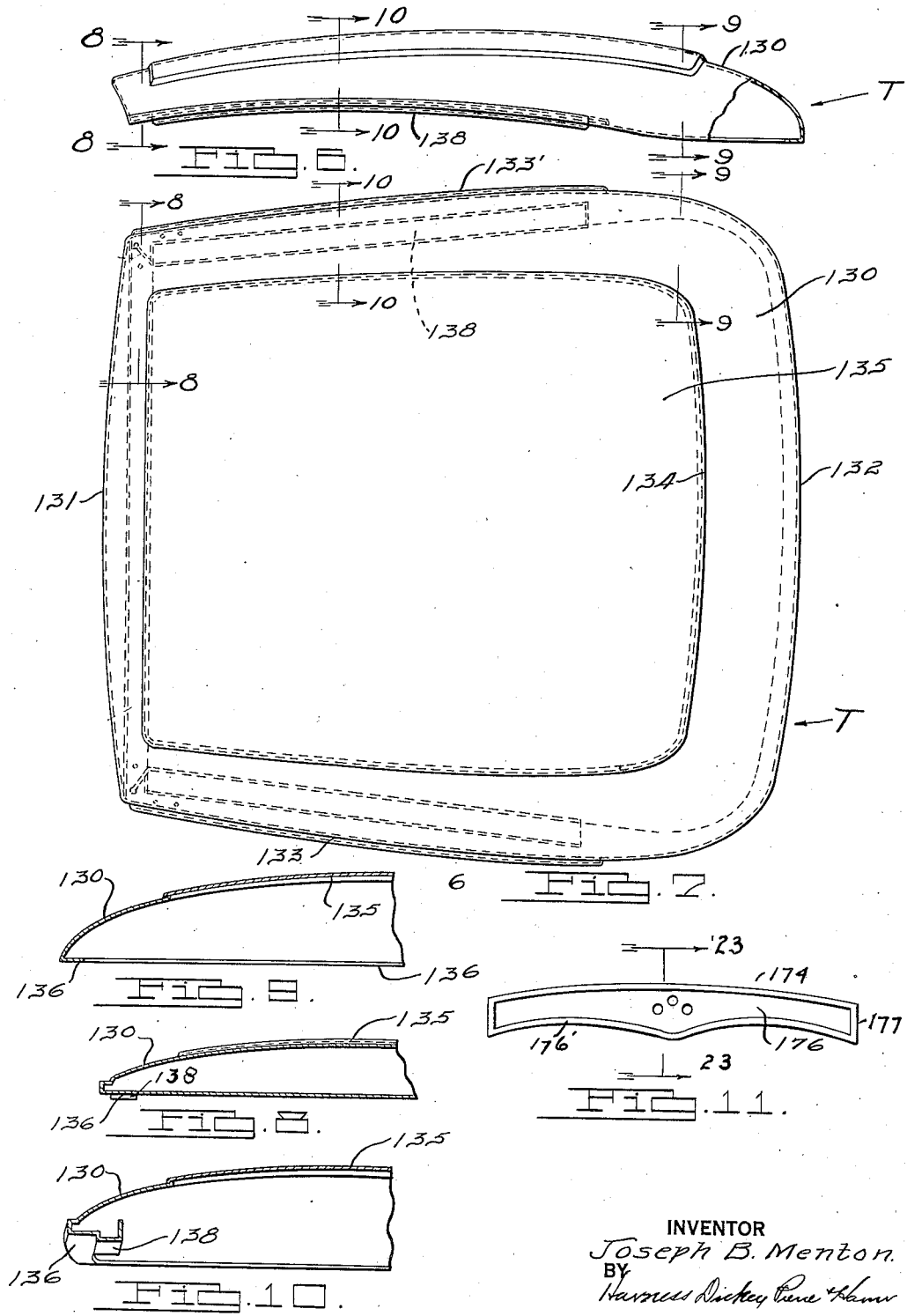

Dec. 24, 1935.   J. B. MENTON   2,025,065
ALL-METAL CAR BODY
Filed April 23, 1930   6 Sheets-Sheet 4
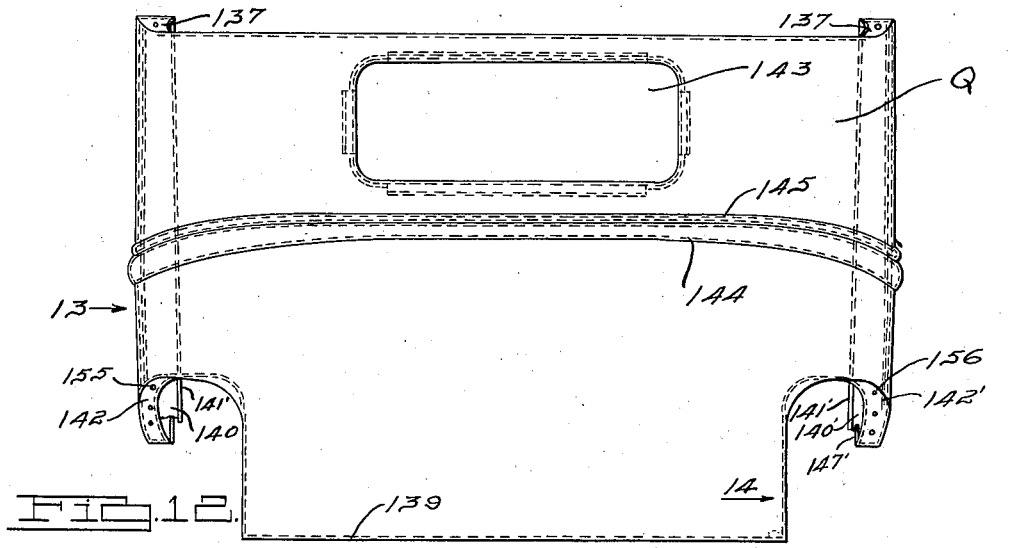
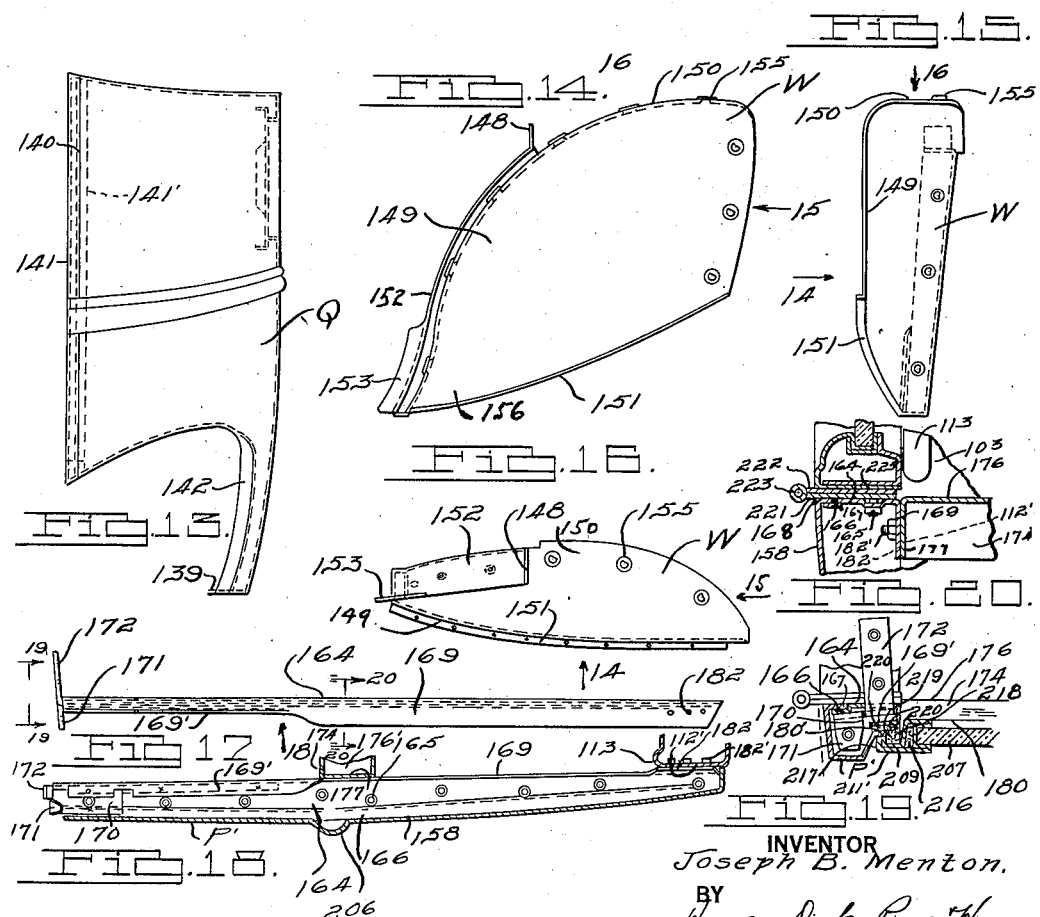
INVENTOR
Joseph B. Menton.
BY
ATTORNEYS.

Dec. 24, 1935.  J. B. MENTON  2,025,065
ALL-METAL CAR BODY
Filed April 23, 1930   6 Sheets-Sheet 5
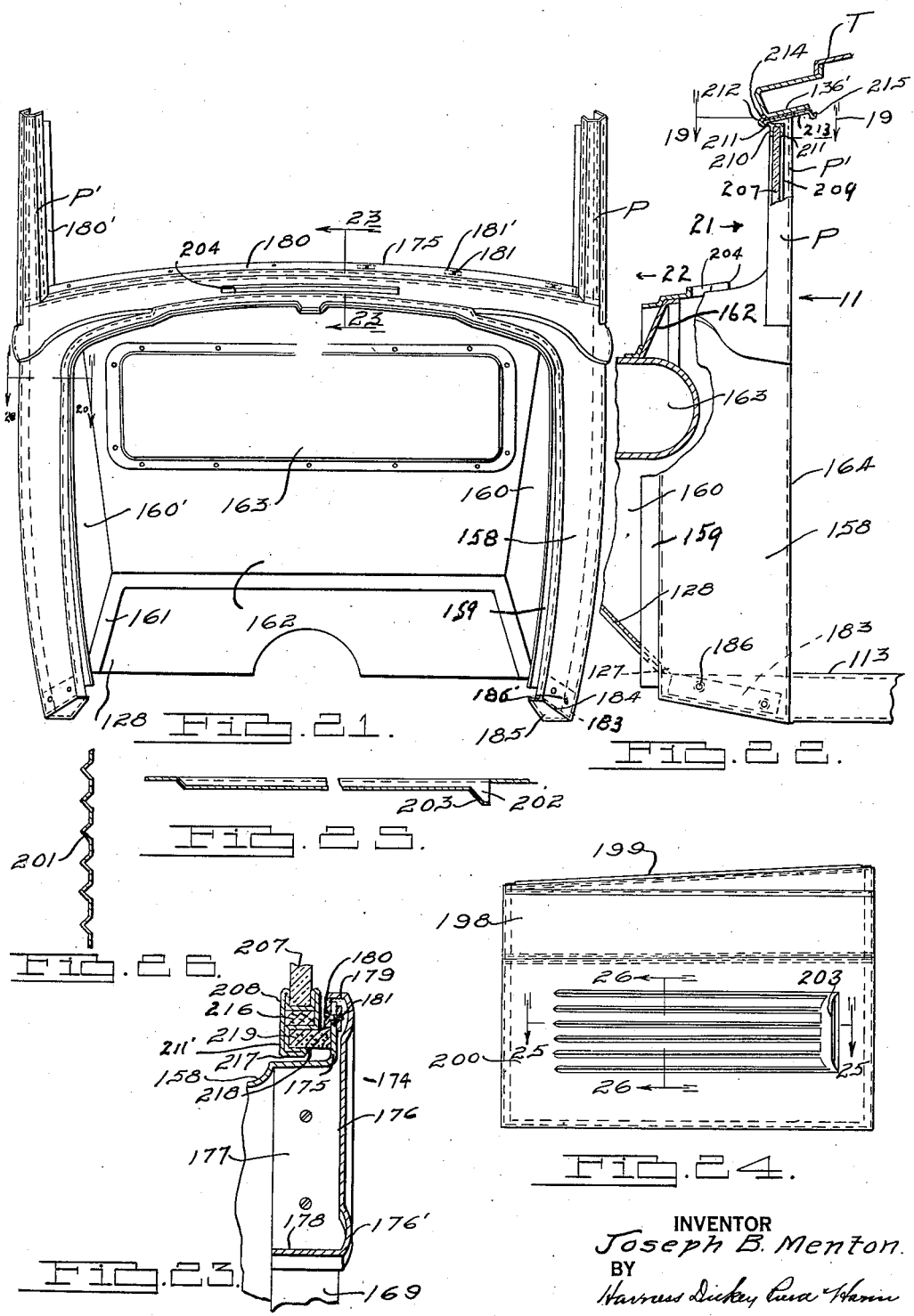
INVENTOR
Joseph B. Menton.
BY
ATTORNEYS.

Dec. 24, 1935.  J. B. MENTON  2,025,065
ALL-METAL CAR BODY
Filed April 23, 1930   6 Sheets-Sheet 6
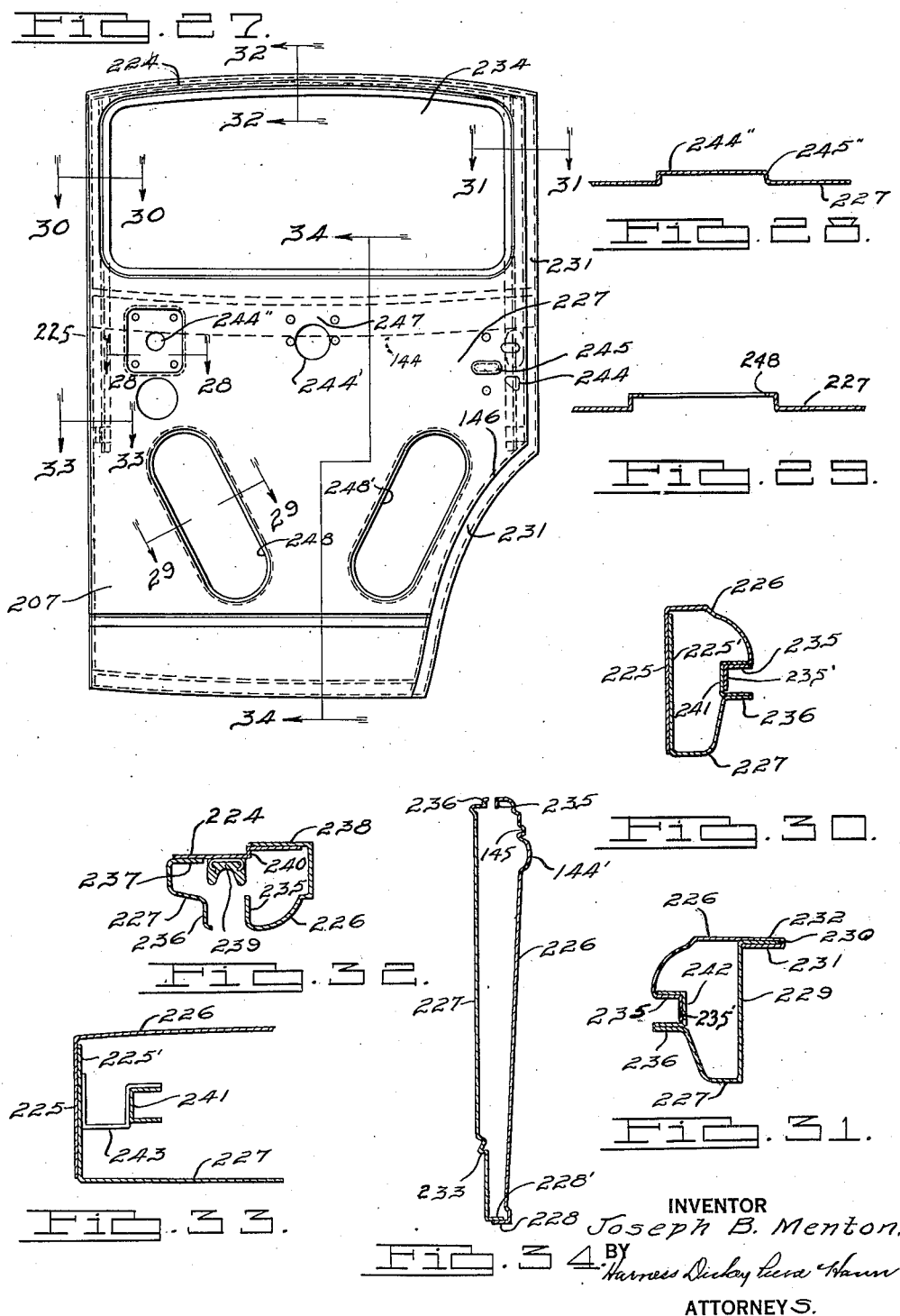

Patented Dec. 24, 1935

2,025,065

UNITED STATES PATENT OFFICE 2,025,065

ALL-METAL CAR BODY

Joseph B. Menton, Detroit, Mich., assignor to The Murray Corporation of America, a corporation of Delaware Application April 23, 1930, Serial No. 446,767

10 Claims. (Cl. 296—28)

This invention aims to produce a light all-metal body for a low-priced automotive vehicle, such as, for example, a two-passenger coupe,—the body being assembled as preformed sections without a separate frame or understructure; and preferred embodiments of the invention may comprise (1) a special roof or top member including a substantially rectangular and flanged "frame" all of whose vertical sections are upwardly convex, (2) a one-piece underbody member, (3) a rear panel and quarter section or member, and (4) a built-up front section or member. The front section or member may include a cowl element and hinge pillars, and all of said members, or all excepting the last-named, may be integrally or inseparably united, as by welding, during assembly, additional parts being secured thereto either by welding or by threaded elements and with an interposition of said so-called "anti-squeak", or the like, wherever required; and it is an object of the invention to adapt all parts to the indicated new mode of assembly.

It is an object of this invention to provide separate members of the general character referred to (two main horizontal members and two main vertical or wall members), which require no use of cooperating wooden parts, said members being preferably so shaped and flanged as to cooperate in the provision of frame elements and jambs and stops for a door opening; and, in preferred embodiments, no usual running board being provided, the door may be of special construction and may extend downwardly over a vertical surface provided at the side of the mentioned underbody member,—the latter being adapted both to unite the mentioned members and to serve as a floor for the car and to be carried directly by a chassis of suitable design.

It is a further object of the present invention to provide an underbody member, preferably of the general character referred to, with special means for securing the same to front and rear members; and also to provide a chassis with various special features of general construction,—said underbody including so-called kick-up features at wheel housings, special reinforcing and clearance-providing features, and finishing features at the door openings, as well as features in adaptation to chassis elements, to wheel housings, to fender elements and/or to the support of seats.

It is a further object of this invention to provide, for use in a car body of the described general character or elsewhere, a built-up body front and cowl section of special design; and said section may include, in addition to a cowl element, a dash element adapted to receive a tank of special design, and external pillar elements having special hinge post elements secured therein and terminating in means for their connection to both the top member and the chassis or the underbody member.

It is a general object of this invention to provide a vehicle body which is formed in substantial entirety from sheet metal panels of substantially uniform gage and from which skeleton framing is for the most part or entirely eliminated.

Other objects of the present invention, including the provision, in the mentioned built-up front section, of a special instrument panel serving for a reinforcing effect, and a special dash adapted to carry a tank and to support a toe board (said toe board being preferably carried jointly by flanges upon said dash and a flange upon the mentioned underbody member or its equivalent) may be best appreciated from the following description of an illustrative embodiment of said invention, taken in connection with the appended claims and the accompanying drawings:

Fig. 1 is a diagrammatic perspective view showing, in their approximate relationships, the principal members employed, some minor elements being incidentally shown.

Fig. 2 is a plan view taken substantially as indicated by the arrows 2 of Figs. 1 and 3 and separately showing a special underbody or bottom member.

Fig. 3 is a side elevational view of the underbottom member,—taken substantially as indicated by the arrow 3 of Fig. 2.

Figs. 4 and 5 are respectively enlarged detail views, taken substantially as indicated by the lines 4—4 and 5—5 of Fig. 2.

Figs. 6 and 7 are respectively a side elevational view and a top plan view of a top member.

Figs. 8–10, inclusive, are detail sectional views, taken substantially as indicated by the lines 8—8, 9—9 and 10—10 of Figs. 6 and 7.

Fig. 11 is an elevational view of an instrument panel designed for a reinforcing effect.

Fig. 12 is a rear elevational view, of a rear and quarter section panel or member,—taken substantially as indicated by the arrow 12 of Fig. 1.

Fig. 13 is a side elevational view, taken substantially as indicated by the arrow 13 of Fig. 12.

Fig. 14 is a side elevational view of a so-called wheel housing panel or element,—this being taken substantially as indicated by the arrows 14 of Figs. 12, 15 and 16.

Figs. 15 and 16 are respectively a rear end view, taken as suggested by arrow 15 of Figs. 14 and 16 and a top plan view, taken as suggested by the arrow 16 of Fig. 15.

Fig. 17 is a side elevational view of a preferred type of hinge pillar post element, provided with means for the connection of a top member therewith,—upper portions thereof being identified by arrows 17 in Fig. 1.

Fig. 18 is a side elevational view taken substantially as indicated by arrow 18 of Fig. 17.

Figs. 19 and 20 are respectively a top plan view and a sectional view taken substantially as indicated by the lines 19—19 and 20—20 of Fig. 17,—additional parts being shown but broken away.

Fig. 21 is a front elevational view of a built-up cowl and hinge pillar section or member,—taken substantially as suggested by arrow 21 of Fig. 22 but with parts omitted or broken away; and Fig. 22 is a corresponding side elevational view,—taken substantially as indicated by arrows 22 of Figs. 1 and 21, but with parts broken away.

Fig. 23 is a vertical sectional view, taken substantially as indicated by the lines 23—23 of Figs. 11 and 21.

Fig. 24 is a side elevational view of a hood,—taken substantially as indicated by arrow 24 of Fig. 1.

Figs. 25 and 26 are respectively sectional detail views, taken substantially as indicated by lines 25—25 and 26—26 of Fig. 24.

Fig. 27 is an inside elevational view of a preferred type of door; and

Figs. 28–34, inclusive, are respectively detail sectional views, taken substantially as indicated by the lines 28—28 to 34—34 of Fig. 27.

Figs. 35 and 36 are respectively sectional detail views,—taken substantially as indicated by the lines 35—35 and 36—36 of Fig. 3 and Fig. 2.

Referring first to the more general features of the present invention, as shown in Fig. 1, the novel and inexpensive body to whose protection the present application is directed may include, in addition to a top member T and an underbody section or member U, (adapted to provide a floor and directly to overlie a chassis), a rear panel and quarter section or member Q and a built-up front or cowl section S,—the latter including so-called hinge-pillars P, P', which include posts that are adapted pivotally to support doors D. The underbody member U may be bolted to a suitable chassis C (see Fig. 2); the mentioned main members may be adapted to cooperate, in the manner suggested in Fig. 1, with any desired additional and subordinate elements such as wheel housings W, rear fenders F, front fenders F', a hood H, a radiator shell R and/or a transverse member M,—adapted to interconnect the front fenders F' beneath the radiator; and it may be well to note, as one of the broader features of the invention, that the particular embodiment illustrated contemplates interconnection of members such as T and the rear wall member Q by means of integral mating flanges provided thereon and serving also for reinforcing frame effect.

The underbody or bottom member U is shown in Figs. 2 and 3 as stamped from a single piece of sheet metal, widest near the central portion thereof and provided with a central upward convexity 100,—such as may serve both for a longitudinal reinforcing effect and to provide ample clearance for a propeller shaft (not shown). The convexity 100 is shown as forwardly terminated by a cut-out 101, to provide play for engine or transmission parts; and as rearwardly continuous with a broader and higher convexity 102,—which may provide additional clearance for a usual planetary gear housing (not shown). Both a low forward portion 103, serving as a floor, and a relatively elevated rearward portion 104 of said bottom member may be adapted to follow in curvature and directly to overlie correspondingly shaped longitudinal elements 105, 105' of the chassis C, or its equivalent,—as shown only in Figs. 2 and 36. Rearward portions of the mentioned longitudinal elements may extend substantially parallel with one another and with flanges 106, provided upon the rearward and elevated portion 104 of the bottom member; and said longitudinal elements may include also forwardly convergent portions 107, 107', extending forward beneath the hood H and the radiator R in a usual manner. Said longitudinal elements may have the form of inverted channel elements provided with horizontal flanges 108; and the forwardly convergent portions thereof may be interconnected by means such as transverse channel elements 109, 109'. These may take the form of upwardly concave channel elements,—similar to the elements 105, 105' but disposed with their lateral flanges 110 in engagement with (and preferably welded or riveted, as at 111, to) the flanges of the channel elements 105, 105'.

The bottom member U is shown as provided beneath the doors D, with a comparatively broad vertical flange 112, serving as a sill and sufficient to conceal the mentioned channel elements; and said flange may be provided at the upper edge thereof with a broad bead 113, normally concealed by the door D, but adapted to serve as a scuff plate. The mentioned bead will be seen to provide a reinforcement; and additional reinforcing effects may be obtained by means including the provision of a so-called French edge 114, inwardly extending at the bottom of the flange 112, and/or spacing inserts 115, 115'. The latter are shown as engaging the under surface of the floor 103 (being preferably welded thereto, as at 116, 116') and as engaging also the inner surface of the flange 112, and the upper surfaces of the channel elements 107 and 109. These spacing inserts 115, 115' may, if desired, be supplemented by bolts directly securing the underbody to the chassis frame. For example, the floor 103 being optionally provided with local upward convexities, as at 117, 117', suitable to provide seat stops and/or to provide clearance for bolt heads, connection may be effected by means such as bolts 118, 118',—so-called anti-squeak being preferably interposed at 119, 119' and elsewhere as deemed expedient.

Additional reinforcement may be effected by means such as diagonal braces 120, extending between floor 103 and the flange or inturned edge 114, as suggested in Figs. 2 and 35; a cut-out 121 is normally covered by a seat (not shown); floor-extending depressions or pans 122, 122' may be so disposed beneath seats as to provide additional inclined reinforcing walls 123, 123'; lateral and upwardly convex extensions 124, 124', inwardly continuous with the upward convexity 100 may serve not only for a reinforcing effect but to provide lugs 125 for the pivotal attachment of seats; a downwardly extending flange 126, at the rearward end of the bottom or underbody member, may serve both for reinforcing and finishing effects; an upwardly inclined flange 127 at the front of the underbody, may serve for the attachment of a toe plate 128, preferably connected also with a flange provided by a dash element at the front of the body section S,—suggested in Fig. 1; and the flange 112 may forwardly be shaped in adaptation to the front section S and terminated in an off-set 129, suitable to interfit within a cowl element near a hood-receiving flange or a downward extension thereof, as hereinafter referred to.

Referring to Figs. 6–11, inclusive, the top member T will be seen to include a rectangular frame element 130, somewhat trapezoidal in plan outline, although the front edge 131, the rear edge 132 and the lateral edges 133, 133' thereof (as also the reinforcing edge or offset 134, designed to eliminate rumble and defining a so-called header panel 135) are shown outwardly convex. Optionally, the so-called header panel 135 may be formed integral with the trapezoidal "frame" 130 surrounding the same. This frame may be not only upwardly convex in all sections, as suggested in Figs. 8–10, inclusive, but provided, about its entire periphery, with an inwardly extending flange 136—adapted to serve as a so-called roof rail, to facilitate interconnection of the top member T with the rear and quarter panel member Q. This is shown as provided with a corresponding flange 137, at the top thereof, such that a "plate" or upper "horizontal" frame element may be formed by uniting the mentioned flanges. The front corner portions of the flange 136 may also serve, as best shown in Fig. 1 for the attachment of the posts of pillars of the front section S to the top T; and, in the region of the doors D, said flange may be extended downwardly and inwardly (and then upwardly, if desired) as best shown in Fig. 10—to provide a top section 138 of a door jamb (and a reinforcing flange, suitable also for the attachment of a lining material, not shown).

Referring now to Figs. 1 and 12–15, inclusive, the rear panel and quarter section or member Q is shown as provided not only with the mentioned flange 137, at the upper edge thereof, but with a similar flange 139, adapted to engage, and preferably to be welded to, the bottom member U. It may also include substantially vertical flanges 140, 140', adapted to serve as door jamb elements (with which stop flanges 141 optionally including rebent flanges 141 may be integral, as best shown in Figs. 1, 12 and 13) and flanges 142, 142'—the latter adapted to cooperate with like flanges upon wheel housing elements W, in case the latter are employed.

The rear member Q is shown as provided with a suitably flanged opening 143, for a rear window, and as reinforced by an ornamental belt 144, with which a decorative bead 145 may be associated; and, in case the wheel housing panels W extend forwardly of the flanges 140, the doors D being correspondingly cut away, as at 146, re-bent extensions 147, 147', at the forward ends of flanges 142, 142' and the lower ends of the flanges 140, 140', may interfit with any upwardly extending lugs 148, if provided upon the wheel housing elements W, to afford guidance in the assembly of the mentioned parts and to contribute to the rigidity of the assembly formed therefrom. The wheel housing sections W are shown as provided with substantially vertical inner walls 149, continuous with over-arching portions 150, at the top thereof; and they may be integral also with curved and continuous inwardly extending flanges 151, adapted to be engaged by, and preferably to be welded to, the underbody member U. An extra reinforcing effect may be obtained in the region opposite the cutout 146 in the door D, by re-doubling the sheet metal at the top of the forward part of the wheel housing back upon itself to form part of a so-called scuff-plate, as suggested at 152; and a door stop element 153 may advantageously be formed integral with the redoubled portion referred to. In order to provide for the secure but removable retention of the rear fenders F, shown as provided with a series of bolt holes 154, the top portion 150 of the wheel housing W, where engaged by the flange 142 or 142' at the edge of the opening designed to receive the wheel housing, may be provided with threaded means such as a series of clinch nuts 155, exactly corresponding depressions being provided at 156 in the flanges 142, 142'. The tops 150 of housings W may be welded to flanges 142, 142', to complete a rear section, in advance of or welding of flanges 139 and 151 to underbody member U, adjacent the downwardly extending rear flange 126 of the latter, and the attachment of the remaining main sections.

As may be best appreciated from an inspection of Fig. 1, an upwardly convex and outwardly deflected "dogleg" forward portion 156 of each wheel housing W may extend partially beneath a door D and overlie a correspondingly curved and deflected arch 157 if provided in the body member; and, in case the wheel housings are respectively provided with the suggested rows of so-called "clinch" nuts 155, a major sub-assembly comprising a top member T, a bottom member U and a wall member such as the rear and quarter member Q (preferably with the respective wheel housings W, and/or the rear fenders F) may be completed by welding the top member to the wall member, as by means of the flanges 136, 137, before or after the uniting of flanges 142, 142' to the respective wheel housings and the uniting of flanges 139 and 151 to the underbody member U. The fenders F may, in this case have the form of mere inverted "boats" removably secured by a longitudinally extending row of bolts which are accessible from beneath the same; but the rearward ends thereof may be interconnected, if desired, by a trunk-carrier plate (not shown).

To complete an all-metal body for a small car, a suitably constructed front and cowl section or member S may be separately assembled and thereafter bolted or otherwise secured to the top member T and to the underbody member U in such a manner as to provide a suitable opening or openings for a door or for two oppositely disposed doors D,—hinge posts for the latter being preferably provided by reenforcements extending throughout the mentioned pillars P, P'. As best shown in Figs. 17–23, inclusive, the section S may include, in addition to a cowl element 158, forwardly terminating in an offset flange 159 for a hood, some suitable dash element. For example, the dash may include, in addition to substantially triangular "cheek" portions 160, 160', both a toe board riser or lower section 161, adapted to serve as or to receive a mentioned plate 128, and also an upper, inclined section 162, so cut out as to receive and support a fuel tank 163. The side portions of the dash element may interfit and be spot welded, at the concealed rear edge thereof, within or rearwardly of the mentioned flange 159 of the cowl 158; and the pillars P, P' may respectively include or enclose reinforcing posts such as are separately shown in Figs. 17–20 inclusive—these posts being intended not only to reinforce the cowl, preferably spot-welded thereto, and to support the top, but to provide jambs for the doors D.

As indicated in Figs. 17, 18 and 20, each reinforcing post may be, throughout the major portion thereof, substantially L-shaped in section,— a straight and flat surface 164 thereof being preferably provided with clinch nuts 165 and also with a forwardly offset portion 166, adapted to receive an inwardly extending flange 167 adjacent a substantially vertical rear edge 168 of the cowl element 158. Within pillars P, P', whose cover elements are U-shaped in section, a forwardly extending flange 169 of each post may be bent outward, as at 169', substantially parallel with the flat surface 164; said cover elements may be welded or formed integral with the cowl element; and a bracket or gusset plate 170 may be secured to one or more of the substantially parallel surfaces so provided and employed to secure the front corners of the top member T at the open tops of the pillars P, P'. For example, the plate 170 may upwardly terminate in oppositely bent bolt-receiving fingers 171 and 172 adapted to engage the flange on top T,—one of the mentioned fingers being preferably so shaped and positioned as to bridge any gap 173 that may result (as suggested in Fig. 7) from the mode of production of a flange 136, including its front portion 136' integral with the top frame 130, or its equivalent.

As best shown in Figs. 11 and 18-23, inclusive, the front section S may be additionally provided with a transverse reinforcing element 174, extending between (and preferably secured by screws to) flanges 169 of a pair of pillar-reinforcing posts such as are shown in Figs. 17-20; and this transverse reinforcing element may be so disposed relatively to a flange 175, if the latter is provided at the top of the cowl element 158, as to serve for a cowl bar and an instrument panel. For example, the element 174 may include not only a substantially vertical wall 176, suitable for the support of instruments, but end flanges 177, adapted to engage the mentioned hinge-carrying posts, and transverse flanges 178, 179 and 180,—the latter being adapted to overlie the mentioned flange 175 and to be secured thereto, as by screws or bolts 181. These may engage threads in clinch nuts or spot-welded plates 181' on flange 175. In view of a forward convergence of portions of 112' of the vertical flanges at the sides of the underbody member U, the respective flanges 169, constituting the inner faces of the respective hinge-carrying posts may be slightly deflected in their lower portions 182; and the respective flanges here referred to may be provided with corresponding openings for bolts, 182', serving to secure the built-up front section S to the underbody member U.

As suggested in Figs. 1, 21 and 22, to provide on the cowl element 158 a local reinforcement in the region of attachment of front fenders F', nut-carrying plates 183 may be secured adjacent lower and forwardly convergent edges 184 which are provided with inturning flanges 185 adapted to engage inturned flanges provided on the lower edges of the forward ends of the underbody flanges 112', and the fender elements F' may be secured to the cowl element 158 by means including bolts extending through openings 186 and 186' provided in said fenders, cowl panel and into the nuts secured in the plate 183. Additional bolts may extend through openings 188, in a bonnet sill member 189 secured to each fender F' and/or through corresponding openings 188' in a lower portion of the hood-receiving flange 159. The front fenders F' may be interconnected by means such as a transverse bar 190, extending therebetween in front of the radiator R, and/or by the mentioned member M,— adapted to underlie a flange 191 at the bottom of the radiator R and to be secured to the fenders F' in any suitable way,—as by means of bolts extending through openings 192, 192'; and both radiator R and any flat vertical flanges 193, provided adjacent lower edges 193 of the fenders F', may be additionally secured by bolts connecting the same directly or indirectly with chassis C or bonnet sill 189,—the fender edges 193 being provided with bolt openings 195 opposite like openings in member 189, or its equivalent. This member is shown as provided with an inwardly extending hood-receiving flange 189'.

Although the hood H may be of any usual or preferred construction adapting it to interfit not only with the mentioned flange 159, provided upon the cowl element 158, but also with a flange 197, provided upon the shell of radiator R, the hood illustrated in Figs. 1 and 23-25 inclusive, will be seen to include curved top sections 198, 198', interconnected by a hinge 199, and side sections 200, 200', similarly connected to said top sections; and each of said side sections may be provided with a series of longitudinally extending ribs 201, which may be cut out to provide louvres. At the rearward end of the mentioned set of reinforcing corrugations an inclined or vertical louvre may be provided as at 202 and 203.

The rounded top surface 158' of the cowl element 158 may be provided with a central rectangular opening 204, preferably having upstanding edges to receive a cover (not shown) through which a "gas" hose may be inserted to fill the tank 163,—in case it is provided with an opening within the cowl. The belt opening 144 and the bead 145 may extend across the doors D, as at 144' and 145', for a reinforcing and decorative effect; and these elements may harmonize with effects produced by reinforcing sinuous offsets 205, 205',—shown in the top of the cowl element as rearwardly terminating in slight bulges 206, corresponding in vertical diameter to the belt 144 and partially surrounding the bases of the pillars P, P'.

Section S may be provided with any suitable windshield organization. For example, referring again to Fig. 11 (taken as indicated by an arrow 11 of Fig. 22, but showing only panel board 176, included in the box-type reinforcing member and surrounded by a peripheral bead 176') and also to Figs. 19, 20 and 23 (taken somewhat as suggested by broken line 19—19 of Fig. 22 and by line 20—20 of Fig. 21 and by line 23—23 of Fig. 11) a frame surrounding a windshield glass 207 may include a bottom element 208, side element 209, and a top element 210; and said elements may provide a continuous inwardly facing channel for the glass 207 and also an outwardly extending flange. As best shown in Fig. 22, the top element 210 may have the outwardly extending flange 211 connected by a longitudinally extending hinge 212, of the so-called "piano" type with a plate 213, adapted to continuously engage, and to be secured to the inwardly extending flange 136' of the top T. If desired, a weather strip including a bead 214 may be interposed between a plate 213 and flange 136'; and said plate may inwardly terminate in a downwardly and then upwardly extending flange 75

215, suitable for the attachment of interior trim (not shown).

Any or all portions of the frame referred to may include a filling strip 216; and the side and bottom portions of said frame may advantageously include not only an outwardly extending flange portion 211' but also a rearwardly extending flange 217,—the latter serving to provide a rearwardly facing channel 218, for a molding or cushion strip 219. At the edges of the windshield, alternatively, as shown in Fig. 19, a cushion may be secured by an extension 220, engaged by a flange 180', such as may be provided at the inner edge of each of the pillars P, P', and the windshield may be provided, at its lower edge or elsewhere, with means for securing the same in any adjusted position,—such means being well known and immaterial to the present invention.

Doors D, two being ordinarily provided, are preferably secured to the front section S by hinges attached to the respective vertical faces 164 of the mentioned post elements included within the hinge pillars P, P' and extending downward over the flanges 112. They may advantageously be secured by means such as piano-type hinges including plates 221 and 222, as best shown in Fig. 20,—these plates being interconnected by a long pivot pin 223. It will be understood from the foregoing that the top T, the underbody U, and the front and rear sections R and S are intended to cooperate in the provision of the door opening or openings; and that the respective doors D, corresponding in length to the mentioned hinge-carrying parts, are herein assumed to extend down over the lateral flanges 112 of the bottom member U.

Referring now to Figs. 27-34, inclusive, a stepped sheet metal strip serving as a top element 224 of each door may interfit with flanges 136, 138 provided at the side of the top, and a vertical flange 225 of each door may be secured to one of the hinge plates 222. The doors may be of "box" type and interfitting flanges at the bottom and sides thereof may serve as the sole frame elements therein.

Although the construction thereof may be varied within wide limits, each door D preferably includes an outer panel 226, with which the hinge-receiving flange 225 may be integral, and an inner panel 227,—the latter being preferably provided at its longer and vertical edge, and as best shown in Fig. 33, with a flange 225', adapted to interfit within the hinge-carrying flange 225. Similarly, flanges 228, 228' may interfit at the bottom of each door, as best shown in Fig. 34. Along its "latch" edge, the inner door element may include a jamb-engaging flange 229 and also an overlap 230. As shown in Fig. 31, this is covered or reinforced by rebending flange 331 of the outer door element 226 thereover. The inner element 227 is shown in Figs. 27 and 34 as provided with a transverse horizontal bead 233, adapted to overlie the bead 113 on the underbody member U.

As shown in Figs. 30-34, a glass-receiving opening 234 may be surrounded by flanges 235 and 236 respectively integral with said outer panel and said inner panel. To facilitate insertion of a glass window plate, the edges of the top flanges 237 and 238 of said outer and inner panels are spaced apart above the window opening and are interconnected by sheet metal strip 224,— which carries a cushion 239 and is offset at 240 to conform to the relative vertical position of the flanges with which it cooperates. Lateral glass guides may each include a channel element 241, 242,—lower portions thereof being supported by spacers 243 secured to flanges 225' and 229, and upper portions thereof being interfitted with flange 235 and extension 235' thereon, secured to flange 236 as shown in Fig. 31.

Any appropriate openings 244, 244', 244" and bosses 245, 245', 245" may be provided in the inner panel 227 in a central region 247, where window manipulating means are to be secured and/or in lateral regions where a latch and/or handle for remote control are to be secured. The opening 244" is shown as positioned just below the level of the external belt reinforcements 144'; and said inner element may also be provided with a pair of comparatively large diagonal openings 248, 248', providing access to the space between the inner element and the outer element available in the securing of the glass plate to means for manipulating the same and/or as means for reinforcing the inner plate or for providing pockets therein.

It will be obvious that in case this car is to be shipped in a knocked-down or partially assembled condition, the various peripheral flanges that have been referred to as cooperating to form the frame of the body may be adapted throughout to be united at destination by the use of screws in preference to welding; and rows of holes are accordingly indicated in or adjacent to some flanges which may ordinarily be welded together.

The nature of any power plant, running gear, interior trim and/or special equipment used therewith may obviously be regarded as immaterial to those inventions in all-metal car body construction to the protection of which the present application is directed,—with an eye to light weight and low cost without sacrifice of rigidity and durability; but it will be understood not only that various features of the present invention might be independently used but also that numerous modifications, additional to any suggested herein, might be readily devised by skilled workers if informed of the foregoing,—all without departure from the scope of the invention as the latter is indicated above and in the following claims.

I claim:

1. A unit body of the closed type including, in combination, a rear quarter section as a unit stamping constituting the sides and rear paneling of the body and having at least one window opening, a cowl section as a unit element formed with spaced pillars, a top supported at its front edges on said pillars and at its rear edges on the quarter section having preformed portions at its front and side edges to form the top jambs for the windshield and doors, and an under section as a unit stamping forming a flooring, the rear kickup, and a support for the cowl and quarter sections.

2. A body of the closed type made up from four stampings, spaced front and rear stampings and spaced top and bottom stampings which are united together to form door openings, the edges of said stampings defining said openings being preformed to constitute the jambs of the doors.

3. A unit body of the closed type including, in combination, a rear quarter section as a unit stamping constituting the sides and rear paneling of the body and having at least one window opening, a cowl section as a unit element formed with spaced pillars, a top supported at its front edges on said pillars and at its rear edges on the quarter section, and forming with said pillars and edges of said quarter section the marginal edges of the door and windshield openings.

4. A vehicle body including, in combination, a rear section preformed at its front edges to provide jamb portions at the rear edges of the door openings, a front cowl section preformed at its rear edges to provide jamb portions at the front edges of the door openings, and a roof having portions of the panel edges preformed to provide jamb portions at the top edges of the door openings, said sections when joined together providing continuous jamb faces at the side and top of the door opening.

5. A vehicle body including, in combination, a rear section preformed at its front edges to provide jamb portions at the rear edges of the door opening, a cowl section preformed at its rear edges to provide jamb portions at the front edge of the door opening, and a roof having the side edge portions preformed to provide jamb portions at the top edges of the door openings, said sections when joined together providing a continuous jamb at the sides and top of the door openings, and a floor embodying door sills upon which the cowl and rear sections are supported to form complete door openings.

6. A vehicle body including, in combination, a rear section preformed at its front edges to provide jamb portions at the rear edges of the door opening, a cowl section preformed at its rear edges to provide jamb portions at the front ends of the door opening, and a roof having the side edge portions preformed to provide jamb portions at the top edges of the door openings, said sections when joined together providing a continuous jamb at the side and top of the door opening, said roof at the top edges of the door opening being further preformed laterally to provide a drip projection above the door opening.

7. A vehicle body including, in combination, a rear section, a front section comprising a cowl and two upstanding pillars unjoined at their upper ends, a metal roof section disposed across said rear section and the upper ends of said pillars, said metal roof section being preformed at its front edges to provide the top windshield jamb when mated with the pillars.

8. A vehicle body including, in combination, a rear section preformed at its front edges to provide jamb portions at the rear edges of the door openings, a front cowl section having upstanding pillars spaced apart at the top edges and preformed at its rear edges to form jamb portions at the front edges of the door openings and further preformed on their inner edges to provide jamb portions for the windshield, and a roof having the panels at the side and front edges preformed to provide the top windshield and door jamb portions which unite with the side jamb portions of the windshield and door openings when the sections are secured together.

9. A unit body of the closed type including, in combination, a rear quarter section as a unit stamping constituting the sides and rear paneling of the body and having at least one window opening, a cowl section as a unit element formed with spaced pillars, a top supported at its front edges on said pillars and at its rear edges on said quarter section, and forming with said pillars and edges of said quarter section the marginal edges of the door and windshield openings, said stampings being flanged in their marginal edges and secured together through said mating flanges.

10. A vehicle body including in combination, a rear section preformed in its front edges to provide jamb portions at the rear edges of the door openings, a front cowl section preformed at its rear edges to provide jamb portions at the front edges of the door openings, and a roof flanged in its edges adjacent said sections and secured thereto by means of mating flanges on said sections, said roof having portions of the panel edges preformed to provide jamb portions at the top edges of the door openings, said sections when joined together providing continuous jamb faces at the sides and top of the door opening.

JOSEPH B. MENTON.